United States Patent
Lee et al.

(10) Patent No.: US 10,833,815 B2
(45) Date of Patent: Nov. 10, 2020

(54) METHOD AND APPARATUS FOR PERFORMING SIDELINK COMMUNICATION BASED ON DATA LINK IN NR V2X

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/859,393

(22) Filed: Apr. 27, 2020

(65) Prior Publication Data

US 2020/0274649 A1 Aug. 27, 2020

Related U.S. Application Data

(63) Continuation of application No. PCT/KR2020/002643, filed on Feb. 24, 2020.
(Continued)

(51) Int. Cl.
*H04W 72/04* (2009.01)
*H04L 1/18* (2006.01)
*H04W 80/02* (2009.01)
*H04W 72/08* (2009.01)
*H04W 92/18* (2009.01)

(52) U.S. Cl.
CPC ....... *H04L 1/1819* (2013.01); *H04W 72/0406* (2013.01); *H04W 72/087* (2013.01); *H04W 80/02* (2013.01); *H04W 92/18* (2013.01)

(58) Field of Classification Search
CPC .............. H04L 1/1819; H04W 72/087; H04W 72/0406; H04W 80/02; H04W 92/18
See application file for complete search history.

(56) References Cited

U.S. PATENT DOCUMENTS

2014/0321293 A1* 10/2014 Hwang .................... H04L 1/18
370/242
2017/0215183 A1* 7/2017 Gulati ................. H04L 1/1812
(Continued)

FOREIGN PATENT DOCUMENTS

| KR | 20180107417 | 10/2018 |
|---|---|---|
| KR | 20190002436 | 1/2019 |
| KR | 20190007066 | 1/2019 |

OTHER PUBLICATIONS

International Search Report in International Appln. No. PCT/KR2020/002643, dated Jun. 8, 2020, 6 pages (with English translation).
(Continued)

*Primary Examiner* — Hashim S Bhatti
(74) *Attorney, Agent, or Firm* — Fish & Richardson P.C.

(57) ABSTRACT

Provided herein are a method for performing wireless communication by a first apparatus and an apparatus for supporting the same. The method may include the steps of receiving a service from a second apparatus, through a data link including multiple data paths, and determining whether or not to transmit a sidelink hybrid automatic repeat request (SL HARQ) feedback being related to the service to the second apparatus. Herein, based on Quality of Service (QoS) requirements of a service being transmitted through the multiple data paths, the data link may include the multiple data paths.

18 Claims, 27 Drawing Sheets

Related U.S. Application Data

(60) Provisional application No. 62/809,544, filed on Feb. 22, 2019.

(56) References Cited

U.S. PATENT DOCUMENTS

| 2020/0037343 | A1* | 1/2020 | He ........................ H04W 4/40 |
| 2020/0099479 | A1* | 3/2020 | Park ...................... H04W 4/40 |

OTHER PUBLICATIONS

3$^{rd}$ Generation Partnership Project; Huawei, HiSilicon; "Sidelink physical layer procedures for NR V2X," R1-1901537, 3GPP TSG RAN WG1, Athens, Greece, dated Feb.-Mar. 2019, 18 pages.

3rd Generation Partnership Project; Samsung; "On Physical Layer Procedures for NR V2X," R1-1902274, 3GPP TSG RAN WG1, Athens, Greece, dated Feb.-Mar. 2019, 15 pages.

* cited by examiner

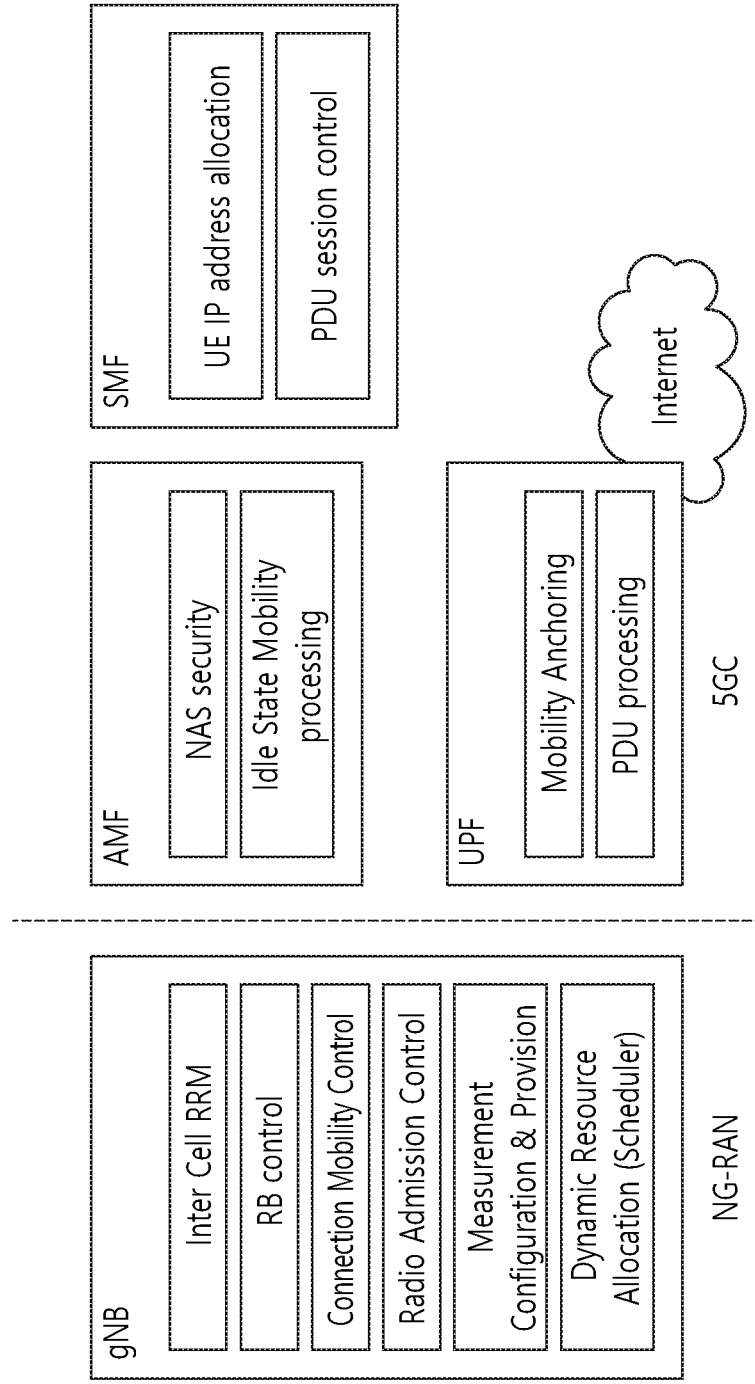

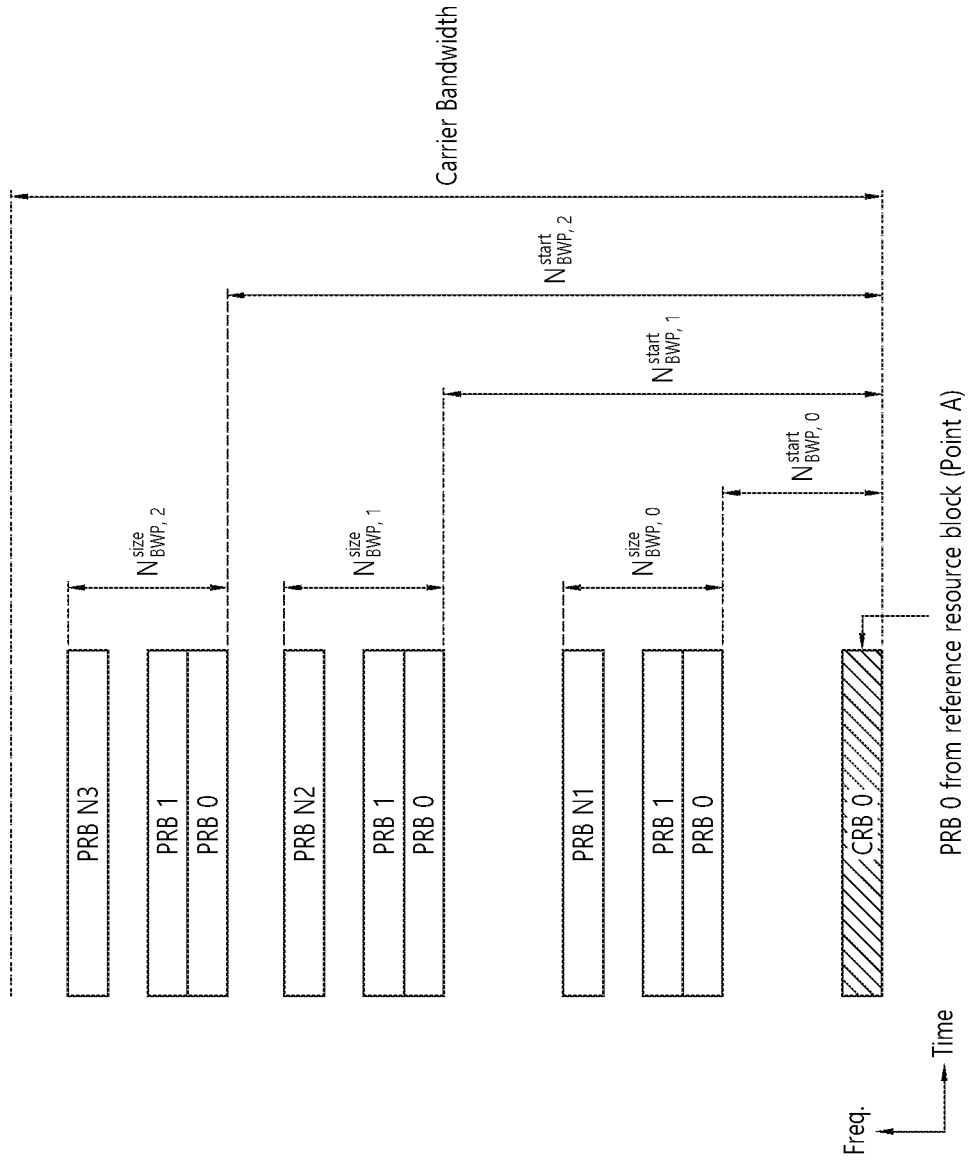

● : Transmitting UE
◎ : Receiving UE

FIG. 21

Transmitting service to first apparatus, through data link including multiple data paths —S2110

METHOD AND APPARATUS FOR PERFORMING SIDELINK COMMUNICATION BASED ON DATA LINK IN NR V2X

CROSS-REFERENCE TO RELATED APPLICATIONS

Pursuant to 35 U.S.C. § 119(e), this application is a continuation of International Application PCT/KR2020/002643, with an international filing date of Feb. 24, 2020, which claims the benefit of U.S. Provisional Patent Application No. 62/809,544, filed on Feb. 22, 2019, the contents of which are hereby incorporated by reference herein in its entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in case an independent PC5 RRC connection is established per service or destination ID between a transmitting user equipment (UE) and a receiving UE, signaling overhead may occur between UEs and complexity may be increased. Therefore, in order to resolve the above-described problems, the proposal of a method for mapping multiple sidelink data paths to one sidelink data link is needed.

Technical Solutions

According to an embodiment, provided herein is a method for performing wireless communication by a first apparatus. The method may include the steps of receiving a service from a second apparatus, through a data link including multiple data paths, and determining whether or not to transmit a sidelink hybrid automatic repeat request (SL HARQ) feedback being related to the service to the second apparatus. Herein, based on Quality of Service (QoS) requirements of a service being transmitted through the multiple data paths, the data link may include the multiple data paths.

According to an embodiment, provided herein is a first apparatus for performing wireless communication. The first apparatus may include one or more memories storing instructions, one or more transceivers, and one or more processors connected to the one or more memories and the one or more transceivers. The one or more processors may execute the instructions to receive a service from a second apparatus, through a data link including multiple data paths, and to determine whether or not to transmit a sidelink hybrid automatic repeat request (SL HARQ) feedback being related to the service to the second apparatus. Herein, based on Quality of Service (QoS) requirements of a service being transmitted through the multiple data paths, the multiple data paths may be included in the data link.

Effects of the Disclosure

A user equipment (UE) may efficiently perform SL communication.

BRIEF DESCRIPTION OF THE DRAWINGS

FIG. 3 shows a functional division between an NG-RAN and a 5GC, in accordance with an embodiment of the present disclosure.

FIG. 7 shows an example of a BWP, in accordance with an embodiment of the present disclosure.

FIG. 21 shows a method for performing wireless communication, by a second apparatus, in accordance with an embodiment of the present disclosure.

DESCRIPTION OF EXEMPLARY EMBODIMENTS

Figure 1:
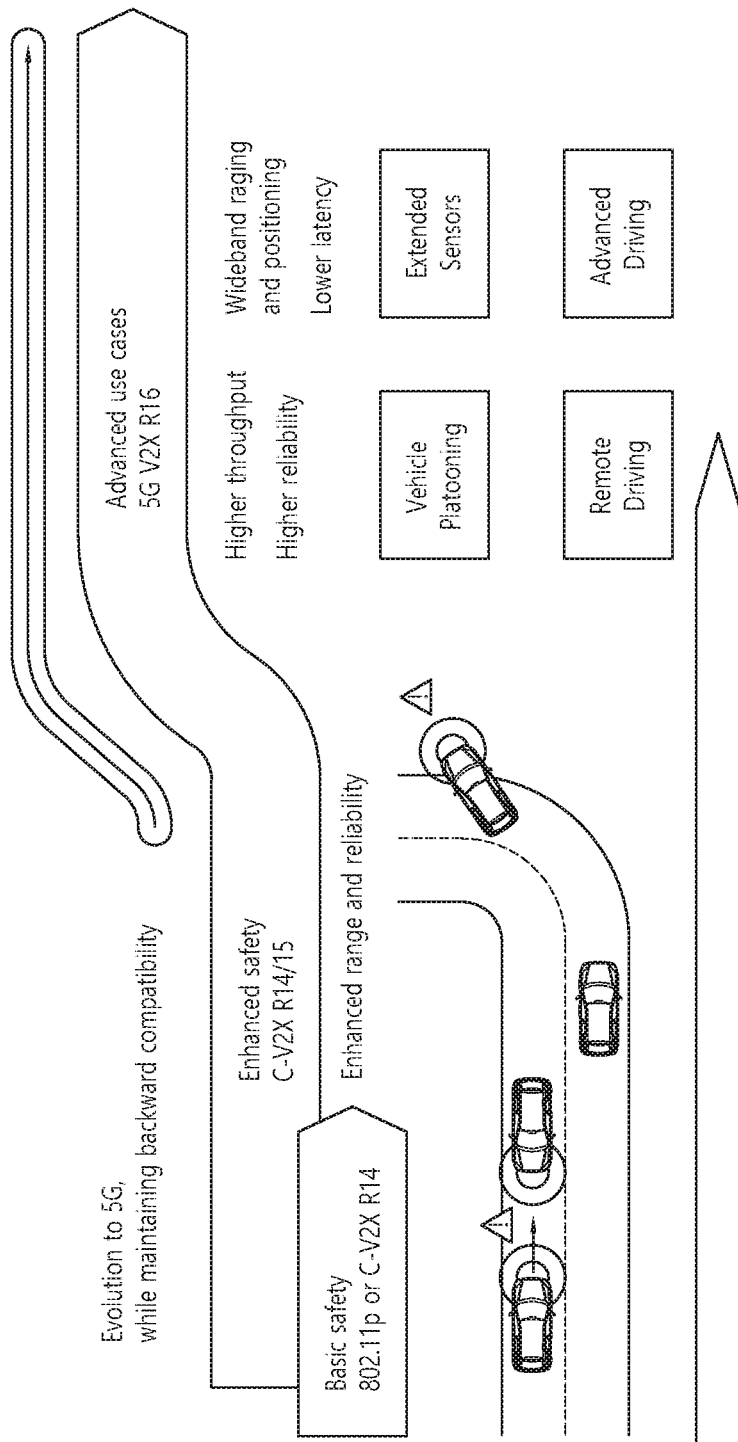
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
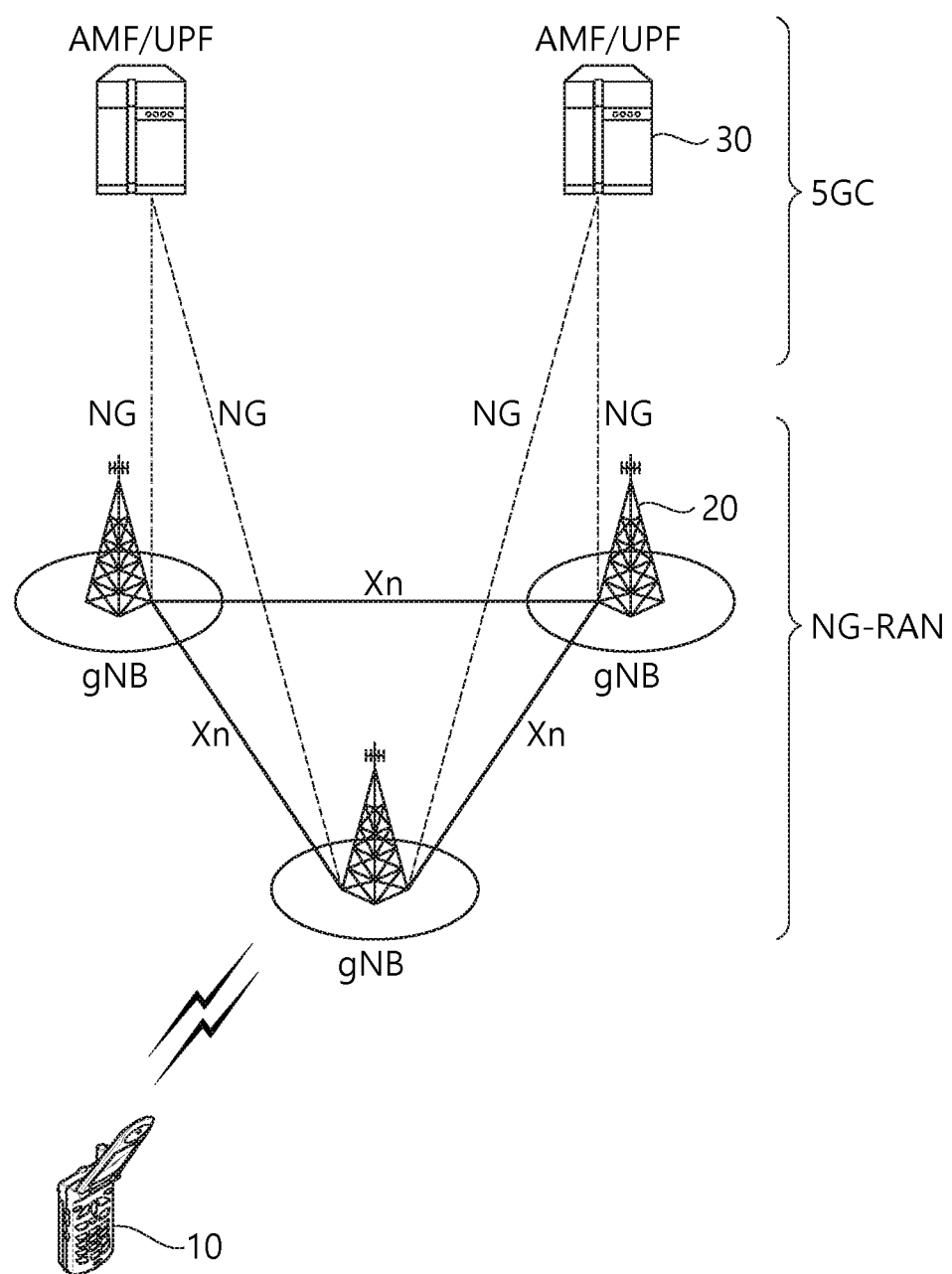
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS (20) providing a UE (10) with a user plane and control plane protocol termination. For example, the BS (20) may include a next generation-Node B (gNB) and/or an evolved-NodeB (eNB). For example, the UE (10) may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE (10) and may be referred to as other terms, such as a base transceiver system (BTS), an access point (AP), and so on.

The embodiment of FIG. 2 exemplifies a case where only the gNB is included. The BSs (20) may be connected to one another via Xn interface. The BS (20) may be connected to one another via 5th generation (5G) core network (5GC) and NG interface. More specifically, the BSs (20) may be connected to an access and mobility management function (AMF) (30) via NG-C interface, and may be connected to a user plane function (UPF) (30) via NG-U interface.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
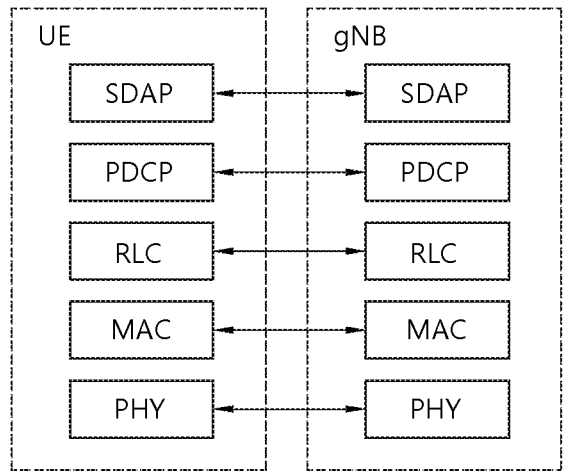
FIGS. 4A and 4B show a radio protocol architecture, in accordance with an embodiment of the present disclosure.
Figure 4B:
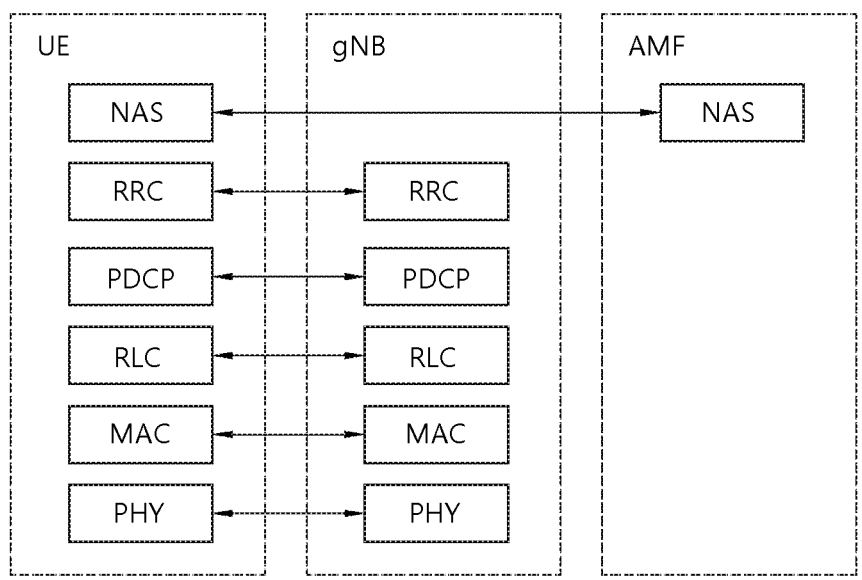

FIGS. 4A and 4B show a radio protocol architecture, in accordance with an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in relation with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), and so on.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
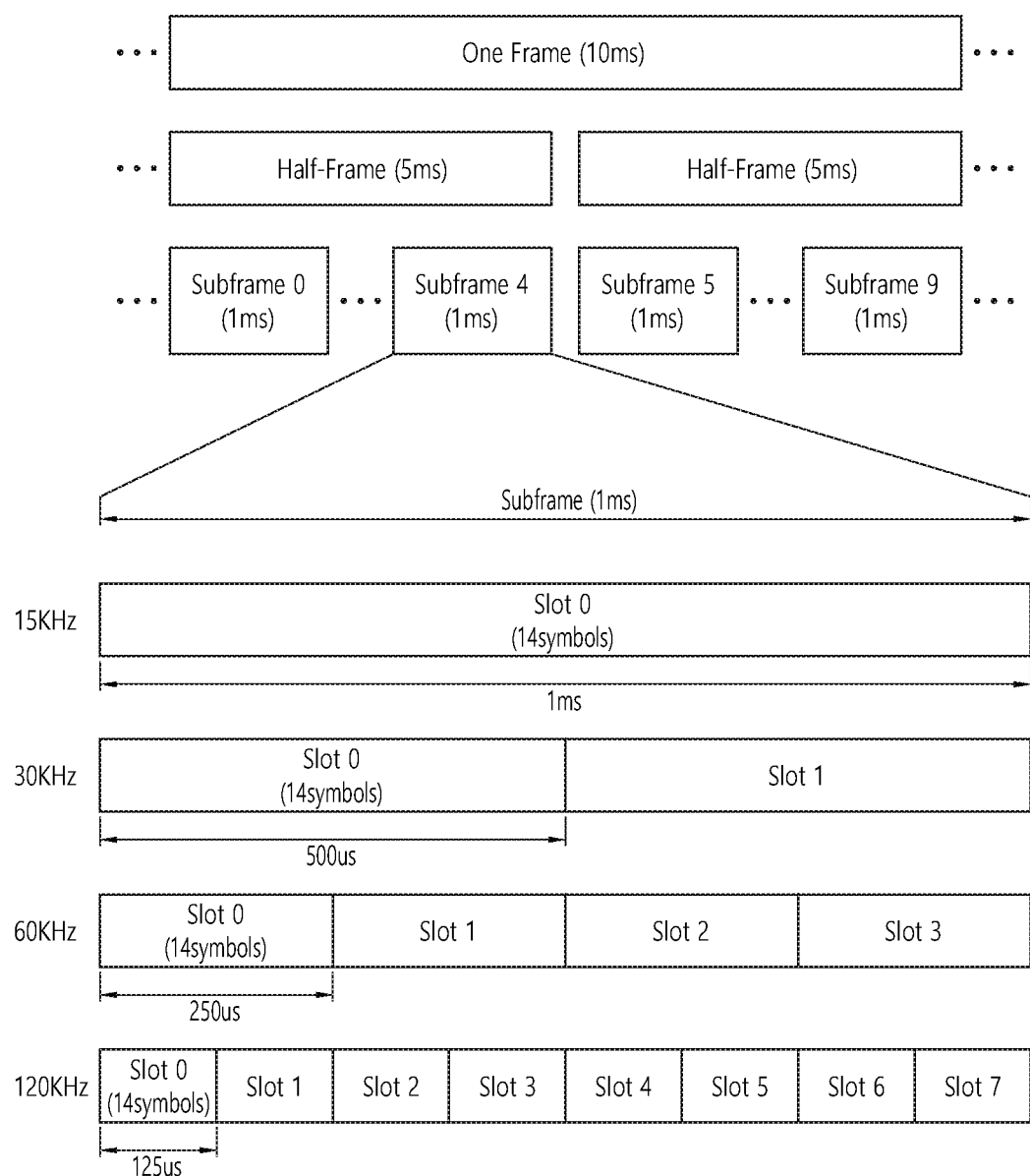
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
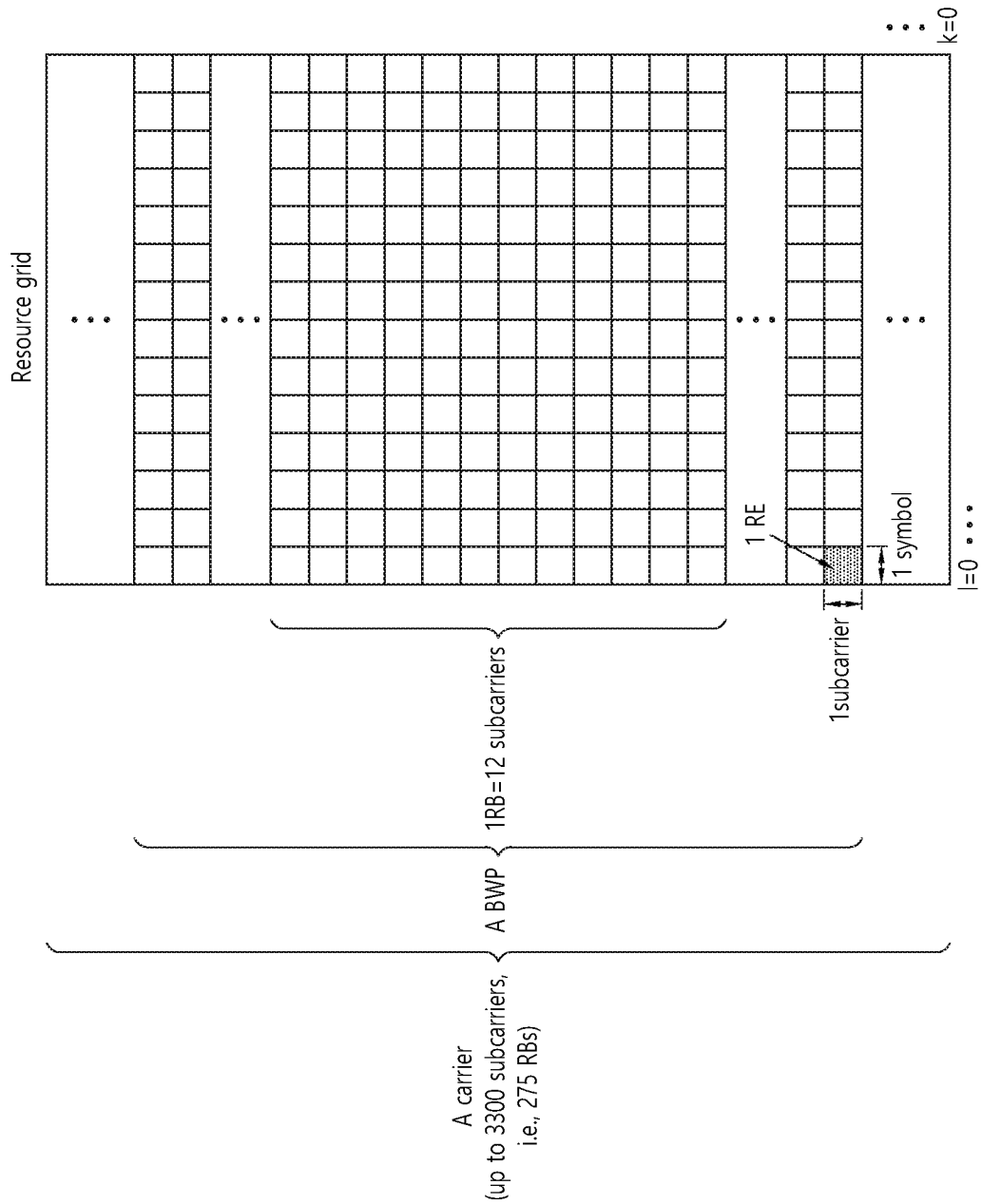
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
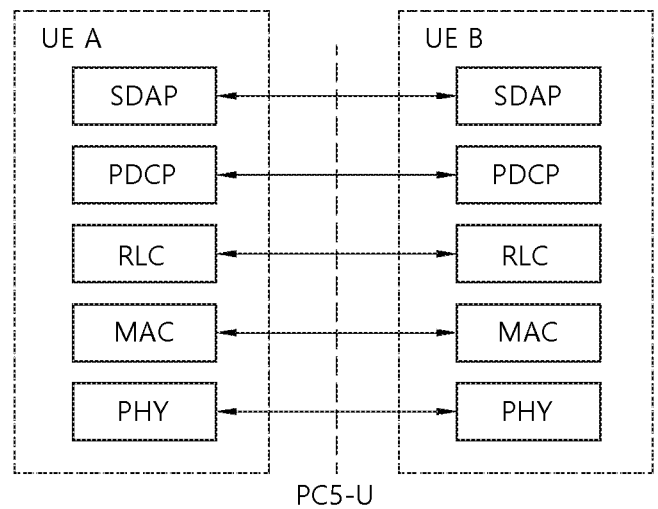
FIGS. 8A and 8B show a radio protocol architecture for a SL communication, in accordance with an embodiment of the present disclosure.
Figure 8B:
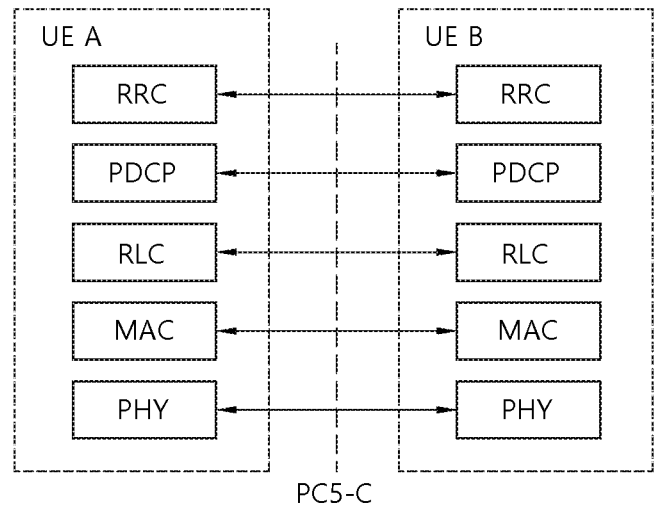

FIGS. 8A and 8B show a radio protocol architecture for a SL communication, in accordance with an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
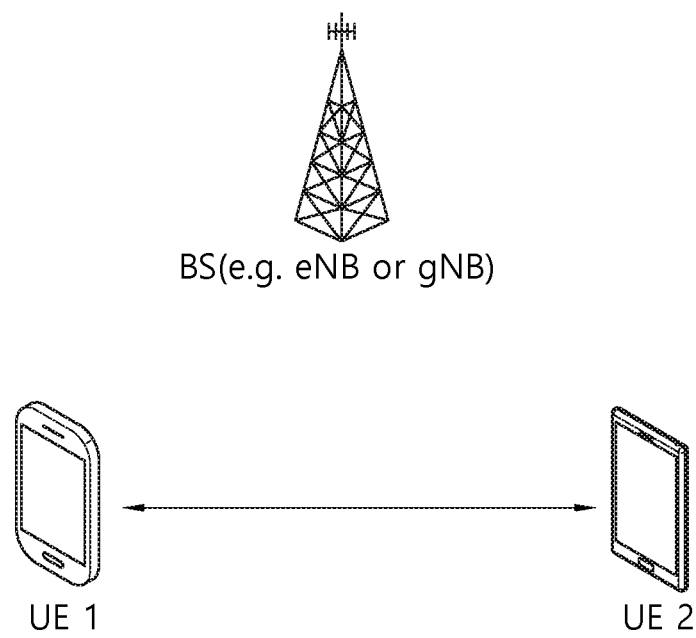
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus (100), and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10B:
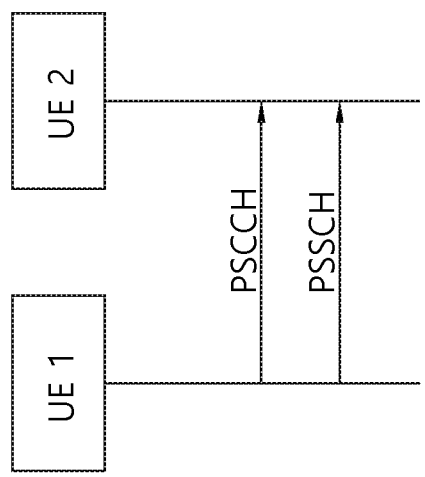
FIGS. 10A and 10B show a procedure of performing V2X or SL communication by a UE based on a transmission mode, in accordance with an embodiment of the present disclosure.
Figure 10A:
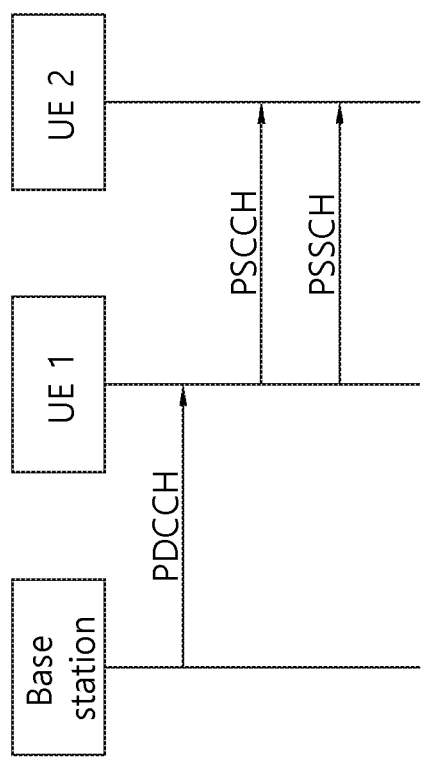

FIGS. 10A and 10B show a procedure of performing V2X or SL communication by a UE based on a transmission mode, in accordance with an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
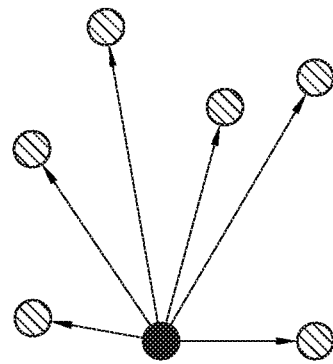
FIGS. 11A to 11C show three cast types, in accordance with an embodiment of the present disclosure.
Figure 11B:
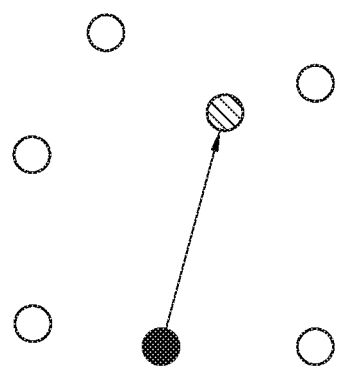
Figure 11C:
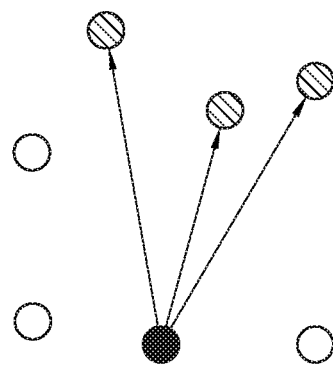

FIGS. 11A to 11C show three cast types, in accordance with an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot # X to a slot # N, the receiving UE may transmit HARQ feedback for the PSSCH to the transmitting UE in a slot # (N+A). For example, the slot # (N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Figure 12:
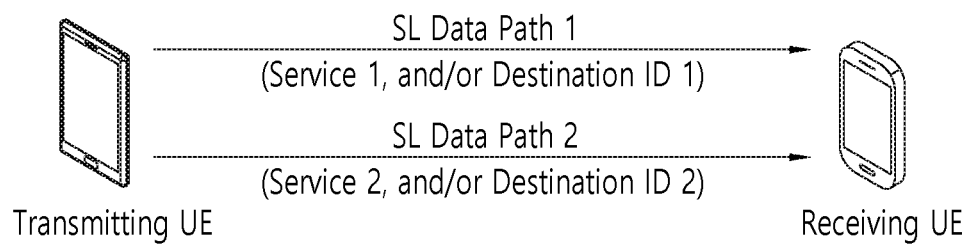
FIG. 12 shows a method for transmitting multiple services, by a same transmitting UE, to a same receiving UE, in accordance with an embodiment of the present disclosure.

FIG. 12 shows a method for transmitting multiple services, by a same transmitting UE, to a same receiving UE, in accordance with an embodiment of the present disclosure. The embodiment of FIG. 12 may be combined with other various embodiments of the present disclosure.

As shown in the embodiment of FIG. 12, in case a same transmitting UE (synchronously) transmits multiple services (e.g., multiple services each having a different destination ID) to a same receiving UE, an independent PC5 RRC connection may be established per service or destination ID. In case an independent PC5 RRC connection is established per service or destination ID between the transmitting UE and the receiving UE, signaling overhead may occur between the UEs. Thus, complexity may be increased. Accordingly, in order to resolve the above-described problems, a method for mapping multiple sidelink data paths to one sidelink data link needs to be proposed. In this specification, for simplicity, a data path may denote a connection being related to a specific service or a specific destination ID between the transmitting UE and the receiving UE. A data link may include multiple data paths, and a data link may also be referred to as other various terms, such as a data path set, and so on.

Hereinafter, according to the embodiment of the present disclosure, a method for performing communication, by a transmitting UE, with a receiving UE based on a data link and an apparatus for supporting the same will be described in detail.

According to the embodiment of the present disclosure, when the same transmitting UE performs sidelink communication for multiple services with the same receiving UE, multiple data paths may be mapped to one data link. For example, when the same transmitting UE synchronously performs sidelink communication for multiple services with the same receiving UE, multiple data paths may be mapped to one data link. A destination ID may be differently defined per service. For example, different services may each have a different destination ID. One data link including multiple data paths may have one data link ID, and the one data link ID may be related to multiple data paths or multiple destination IDs.

Figure 13:
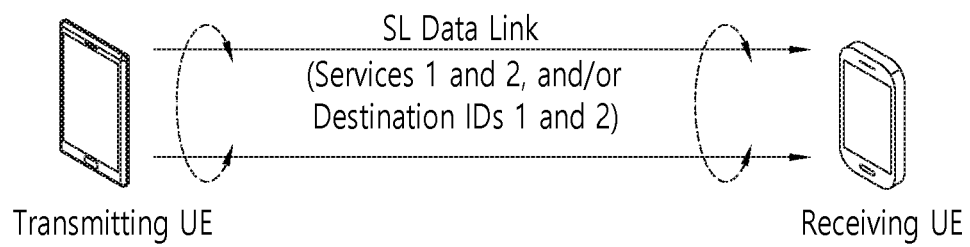
FIG. 13 shows a method for transmitting multiple services, by a same transmitting UE, to a same receiving UE through one SL data link, in accordance with an embodiment of the present disclosure.

FIG. 13 shows a method for transmitting multiple services, by a same transmitting UE, to a same receiving UE through one SL data link, in accordance with an embodiment of the present disclosure. The embodiment of FIG. 13 may be combined with other various embodiments of the present disclosure.

Referring to FIG. 12 and FIG. 13, Data path 1 for Service 1 and Data path 2 for Service 2 may be mapped to one data link for Service 1 and Service 2. Alternatively, Data path 1 related to Destination ID 1 and Data path 2 related to Destination ID 2 may be mapped to one data link ID being related to Destination IDs 1 and 2.

According to the embodiment of the present disclosure, in case multiple data paths between the transmitting UE and the receiving UE are mapped to one data link, the PC5 RRC connection between the transmitting UE and the receiving UE may be performed per data link.

Figure 14:
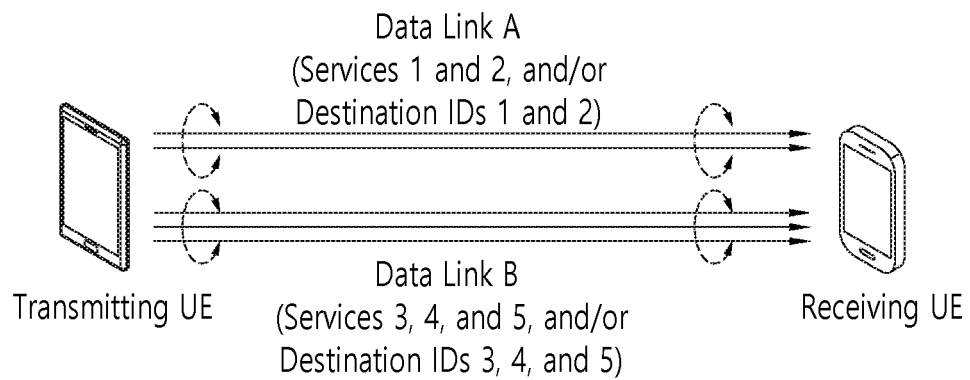
FIG. 14 shows a method for establishing a PC5 RRC connection between a transmitting UE and a receiving UE per data link, in accordance with an embodiment of the present disclosure.

FIG. 14 shows a method for establishing a PC5 RRC connection between a transmitting UE and a receiving UE per data link, in accordance with an embodiment of the present disclosure. The embodiment of FIG. 14 may be combined with other various embodiments of the present disclosure.

For example, referring to FIG. 14, the PC5 RRC connection between the transmitting UE and the receiving UE may be established for each of Data link A and Data link B. In this case, for example, Data link A may have Data Link ID A, and Data link B may have Data Link ID B.

According to the embodiment of the present disclosure, when the transmitting UE transmits a specific service (e.g., a packet, data or message related to a specific service), the transmitting UE may configure a source ID field, a destination ID field, and/or a new pre-defined field on the SCI as a data link ID including a data path related to the specific service. Therefore, the receiving UE may identify the data link through which the specific service is being transmitted based on the data link ID. Information on the data path being related to the specific data link ID may be exchanged in advance between the transmitting UE and the receiving UE. Alternatively, information on a destination ID and/or source ID being related to the specific data link ID may be exchanged in advance between the transmitting UE and the receiving UE. Alternatively, information on service types being related to the specific data link ID may be exchanged in advance between the transmitting UE and the receiving UE. For example, the information may be exchanged in advance between the UE via PC5 RRC signaling.

For example, in the embodiment of FIG. 14, it will be assumed that the receiving UE receives SCI from a transmitting UE intending to transmit a specific service, and that a data link ID being related to Data link B (e.g., Data Link ID B) is set to a source ID field, a destination field, and/or a newly defined field on the SCI. Accordingly, the receiving UE having received Data Link ID B on the SCI may know that the specific service is being transmitted from the transmitting UE through Data link B. For example, the data link ID may also be independently defined for each source and/or destination.

According to the above-described embodiment of the present disclosure, for the link being used by the transmitting UE and the receiving UE, the unnecessary procedure of establishing, by the transmitting UE and the receiving UE, an independent PC5 RRC connection between the transmitting UE and the receiving UE per serving and/or destination ID may be omitted. Thus, unnecessary waste of radio resources may be prevented, and signaling overhead of the UEs may be reduced. Additionally, according to the related art, packets that may be multiplexed (MUX) to the same MAC PDU may be limited to packets having the same destination ID. And, conversely, according to the embodiment of the present disclosure, multiple services (e.g., services each having a different destination ID) being mapped to the same data link ID may be multiplexed (MUX) to one MAC PDU.

Meanwhile, according to the embodiment of the present disclosure, in case multiple data paths are mapped to one data link, multiple data paths or multiple destination IDs being mapped to one data link or one data link ID may each require a different QoS or a different transmission (or transport) profile. For example, the QoS may be reliability, priority, minimum required communication range (MCR), latency, and so on. For example, the profile may mean a (physical) scheme being used for a sidelink service transmission. For example, the profile may include an LTE-based sidelink transmission scheme and an NR-based sidelink transmission scheme. For example, in case the transmitting UE transmits a service that shall also be received by an LTE UE (e.g., a service related to basic safety), a profile of the service may be configured as/mapped to an LTE-based sidelink transmission scheme. For example, in case the transmitting UE transmits an advanced V2X service having relatively tight QoS requirements, the profile of the service may be configured as/mapped to an NR-based sidelink transmission scheme.

In other words, in case multiple data paths are mapped to one data link, the multiple data paths or multiple destination IDs being mapped to one data link or one data link ID may each require a different QoS or a different transmission profile. Therefore, the UE needs to determine a sidelink communication method for a data link including the multiple data paths. For example, the sidelink communication method may include whether or not HARQ feedback is to be enabled, a type of the transmission profile, a transmission parameter value (or transmission scheme type), and/or resource reservation cycle. For example, the transmission parameter value (or transmission scheme type) may be MCS, number of RBs, transmission (or transport) power, largest number of re-transmissions, Channel occupancy Ratio (CR) limit, and so on. Hereinafter, according to the embodiment of the present disclosure, a method for determining, by a UE, a sidelink communication method for a data link including multiple data paths will be described in detail. For simplicity in the description, although the method will be described as a first method, a second method, and a third method, the aforementioned methods will not be mutually exclusive, and, therefore, the first method, the second method, or the third method may be inter-combined.

1. First Method

According to an embodiment of the present disclosure, for a specific data link or a specific data link ID, i) when a UE determines whether or not to enable or disable a sidelink HARQ feedback, or ii) when a UE determines a transmission profile type, or iii) when a UE determines a transmission parameter value (or transmission scheme type), or iv) when a UE determines a resource reservation cycle, the UE may consider, with a higher priority, a data path or destination ID having the tightest QoS requirements (e.g., highest priority level, lowest latency, maximum MCR, highest reliability).

Alternatively, according to the embodiment of the present disclosure, for a specific data link or a specific data link ID, i) when a UE determines whether or not to enable or disable a sidelink HARQ feedback, or ii) when a UE determines a transmission profile type, or iii) when a UE determines a transmission parameter value (or transmission scheme type), or iv) when a UE determines a resource reservation cycle, the UE may consider, with a higher priority, a data path or destination ID being related to services requiring backward compatibility (e.g., services that shall be received by an LTE UE).

Figure 15:
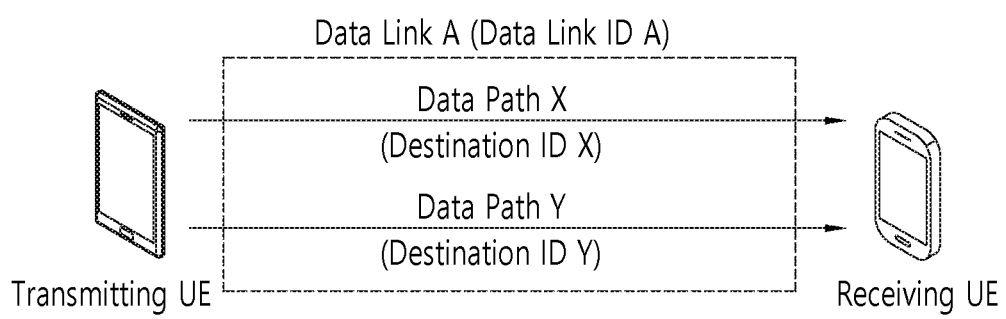
FIG. 15 shows a method for mapping a data path or destination ID being related to two services to one data link or one data link ID, in accordance with an embodiment of the present disclosure.

FIG. 15 shows a method for mapping a data path or destination ID being related to two services to one data link or one data link ID, in accordance with an embodiment of the present disclosure. The embodiment of FIG. 15 may be combined with other various embodiments of the present disclosure.

More specifically, referring to FIG. 15, it will be assumed that a data path or destination ID being related to two services is mapped to one data link or one data link ID. In other words, Data paths X/Y or Destination IDs X/Y may be mapped to Data Link A or Data Link ID A. Further, it will be assumed that reliability requirements related to Data Path X or Destination ID X are higher than reliability requirements related to Data Path Y or Destination ID Y. Additionally, it will also be assumed that Service X being related to Data Path X or Destination ID X requires a sidelink HARQ feedback to be enabled, whereas Service Y being related to Data Path Y or Destination ID Y does not require a sidelink HARQ feedback to be enabled.

Under such assumptions, the UE may enable sidelink HARQ feedback for the data link or the data link ID. More specifically, the UE may consider, with a higher priority, a data path or destination ID having tight QoS requirements. Therefore, in this case, if the transmitting UE transmits Service X to the receiving UE, the receiving UE may transmit an HARQ feedback for Service X to the transmitting UE. Additionally, if the transmitting UE transmits Service Y to the receiving UE, the receiving UE may transmit an HARQ feedback for Service Y to the transmitting UE.

For example, in order to allow the receiving UE to transmit an HARQ feedback for a service being transmitted on Data Link A, the transmitting UE may transmit SCI including information enabling the HARQ feedback to the receiving UE. Alternatively, for example, in order to allow the receiving UE to transmit an HARQ feedback for a service being transmitted on Data Link A, the transmitting UE may transmit information indicating a relationship between the data link ID and the HARQ feedback to the receiving UE. For example, the information indicating the relationship between the data link ID and the HARQ feedback may be defined as shown below in Table 5. Therefore, if the receiving UE having received the information, as shown in Table 5, receives the SCI including Data Link ID A from the transmitting UE, the receiving UE may transmit an HARQ feedback for the service received through Data Link ID A to the transmitting UE. Additionally, the receiving UE may also transmit the information indicating the relationship between the data link ID and the HARQ feedback to the transmitting UE.

TABLE 5

| Data Link ID | HARQ Feedback | Data Link ID | HARQ Feedback |
|---|---|---|---|
| Data Link ID A | Enable | Data Link ID x | Disable |
| Data Link ID B | Enable | Data Link ID y | Disable |
| Data Link ID C | Enable | Data Link ID z | Disable |

As another example, in the embodiment of FIG. 15, it will be assumed that a transmission profile being related to Data Path X or Destination ID X requires an LTE-based sidelink transmission scheme, whereas a transmission profile being related to Data Path Y or Destination ID Y requires an NR-based sidelink transmission scheme. Under this assumption, the UE may apply the LTE-based sidelink transmission scheme for the data link or the data link ID. More specifically, the UE may consider, with a higher priority, a data path or destination ID being related to services requiring backward compatibility.

2. Second Method

According to an embodiment of the present disclosure, at a random time point, for a packet or data (e.g., MAC PDU) being related to a specific data link or a specific data link ID, i) when a UE determines whether or not to enable or disable a sidelink HARQ feedback, or ii) when a UE determines a transmission profile type, or iii) when a UE determines a transmission parameter value (or transmission scheme type), or iv) when a UE determines a resource reservation cycle, the UE may consider, with a higher priority, a packet or data having the tightest QoS requirements (e.g., highest priority level, lowest latency, maximum MCR, highest reliability).

For example, it will be assumed that, when the transmitting UE transmits a service being related to Data Link A to the receiving UE at a random time point, multiple packets being related to different destination IDs are included in the service. In this case, the UE may consider, with a higher priority, a packet having the tightest QoS requirements.

Therefore, for example, in case the service being related to Data Link A includes a packet requiring an HARQ feedback and a packet not requiring an HARQ feedback, the receiving UE having received the service may transmit an HARQ feedback to the transmitting UE. In order to allow the receiving UE to transmit an HARQ feedback for the service being transmitted on Data Link A, the transmitting UE may transmit SCI including information enabling the HARQ feedback to the receiving UE. The receiving UE may perform the HARQ feedback based on the received information enabling the HARQ feedback.

According to an embodiment of the present disclosure, at a random time point, for a packet or data (e.g., MAC PDU) being related to a specific data link or a specific data link ID, i) when a UE determines whether or not to enable or disable a sidelink HARQ feedback, or ii) when a UE determines a transmission profile type, or iii) when a UE determines a transmission parameter value (or transmission scheme type), or iv) when a UE determines a resource reservation cycle, the UE may consider, with a higher priority, a packet or data being related to services requiring backward compatibility (e.g., services that shall be received by an LTE UE).

For example, it will be assumed that, when the transmitting UE transmits a service being related to Data Link A to the receiving UE at a random time point, multiple packets being related to different destination IDs are included in the service. In this case, it will be assumed that a first packet requires an LTE-based sidelink transmission scheme, whereas a second packet requires an NR-based sidelink transmission scheme. Under such assumptions, the UE may also the LTE-based sidelink transmission scheme for the Data Link A. More specifically, the UE may consider, with a higher priority, a packet being related to services requiring backward compatibility 3. Third Method According to an embodiment of the present disclosure, a data path or destination ID requiring the same QoS may be mapped to the same/one data link or data link ID. Alternatively, a data path or destination ID requiring the same profile may be mapped to the same/one data link or data link ID. Alternatively, a data path or destination ID having a QoS (level) difference value being lower than a pre-determined threshold value may be mapped to the same/one data link or data link ID. In the aforementioned cases, for example, a data path or destination ID of a different QoS value may be interpreted as having a different data link or data link ID.

Figure 16:
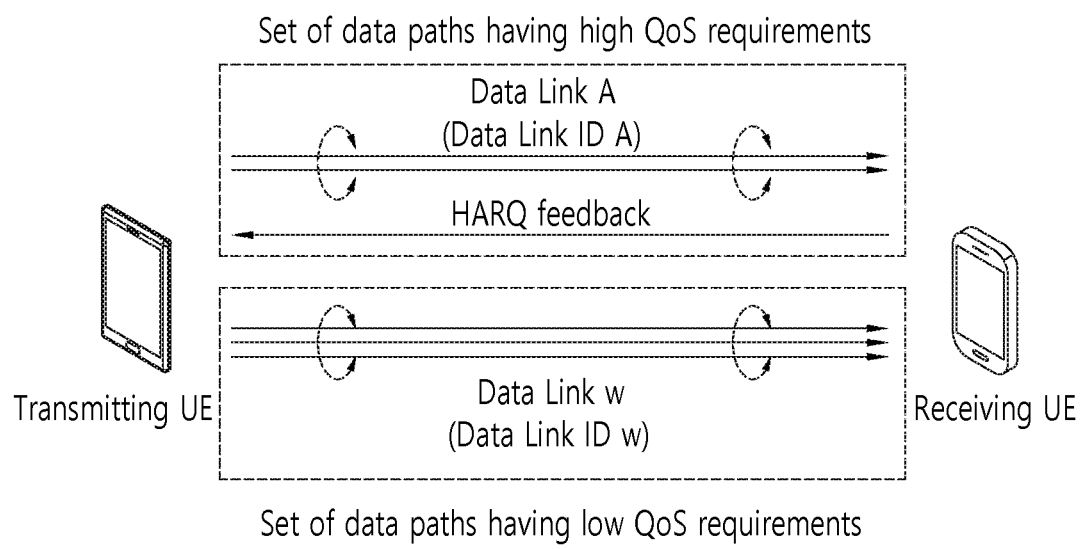
FIG. 16 shows a method for mapping a data path or destination ID to a data link based on a QoS, in accordance with an embodiment of the present disclosure.

FIG. 16 shows a method for mapping a data path or destination ID to a data link based on a QoS, in accordance with an embodiment of the present disclosure. The embodiment of FIG. 16 may be combined with other various embodiments of the present disclosure.

For example, referring to FIG. 16, a data path or destination ID requiring a high QoS may be mapped to Data Link A or Data Link ID A. And, a data path or destination ID requiring a low QoS may be mapped to Data Link w or Data Link ID w.

Additionally, in order to allow the receiving UE to transmit an HARQ feedback for a service being transmitted on Data Link A, the transmitting UE may transmit information indicating a relationship between the data link ID and the HARQ feedback to the receiving UE. For example, the information indicating the relationship between the data link ID and the HARQ feedback may be defined as shown in Table 5. Therefore, if the receiving UE having received the information, as shown in Table 5, receives the SCI including Data Link ID A from the transmitting UE, the receiving UE may transmit an HARQ feedback for the service received through Data Link ID A to the transmitting UE. Additionally, the receiving UE may also transmit the information indicating the relationship between the data link ID and the HARQ feedback to the transmitting UE. Conversely, if the receiving UE receives SCI including Data Link ID w from the transmitting UE, the receiving UE may not transmit an HARQ feedback for the service being received through Data Link w. For example, the information indicating the relationship between the data link ID and the HARQ feedback (i.e., information on whether a sidelink HARQ feedback is enabled or disabled per data link ID) may be exchanged/configured in advance between the transmitting UE and the receiving UE.

Alternatively, in order to allow the receiving UE to transmit an HARQ feedback for a service being transmitted on a data link, the transmitting UE may transmit SCI including information enabling the HARQ feedback to the receiving UE. For example, if the transmitting UE transmits SCI including information enabling the HARQ feedback to the receiving UE, the receiving UE may transmit the HARQ feedback to the transmitting UE. For example, if the transmitting UE transmits SCI not including information enabling the HARQ feedback to the receiving UE, the receiving UE may not transmit the HARQ feedback to the transmitting UE. For example, if the transmitting UE transmits SCI including information disabling the HARQ feedback to the receiving UE through a data link, the receiving UE may not transmit the HARQ feedback to the transmitting UE.

If mapping between multiple data paths or multiple destination IDs and one data link or one data link ID is not applied, the receiving UE may determine whether or not a sidelink HARQ feedback needs to be transmitted based on a destination ID and/or source ID on the SCI. For example, information on whether a sidelink HARQ feedback is enabled or disabled per destination ID and/or source ID may be exchanged/configured in advance between the transmitting UE and the receiving UE.

According to the above-described embodiment of the present disclosure, in case multiple data paths are mapped to one data link, and in case multiple data paths or multiple destination IDs being mapped to one data link or one data link ID each require a different QoS or a different transmission profile, the UE may efficiently determine the sidelink communication method.

Figure 17:
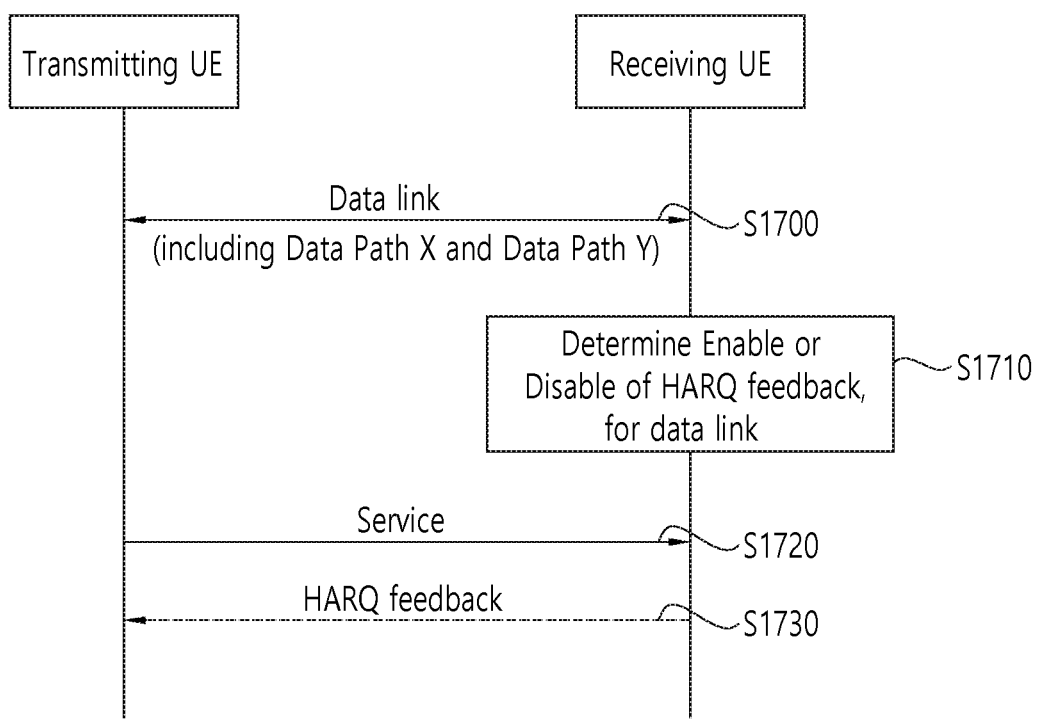
FIG. 17 shows a procedure of determining whether or not to perform, by a receiving UE, HARQ feedback for a data link including multiple data paths, in accordance with an embodiment of the present disclosure.

FIG. 17 shows a procedure of determining whether or not to perform, by a receiving UE, HARQ feedback for a data link including multiple data paths, in accordance with an embodiment of the present disclosure. The embodiment of FIG. 17 may be combined with other various embodiments of the present disclosure.

Referring to FIG. 17, in step S1700, a data link including Data Link X and Data Link Y may be configured between the transmitting UE and the receiving UE. Data Path X may be related to Destination ID X, and Data Path Y may be related to Destination ID Y.

If the QoS requirements of Data Path X are tight, and the QoS requirements of Data Path Y are not tight, in step S1710, the receiving UE may enable HARQ feedback for the data link. If the QoS requirements of Data Path X and Data Path Y are not tight, in step S1710, the receiving UE may not enable HARQ feedback for the data link.

In step S1720, the receiving UE may receive a service from the transmitting UE on the data link. In case the receiving UE enables the HARQ feedback for the data link, in step S1730, the receiving UE may transmit an HARQ feedback for the service to the transmitting UE. In order to allow the receiving UE to enable the HARQ feedback, the transmitting UE may include information enabling the HARQ feedback on the SCI. Alternatively, in order to allow the receiving UE to enable the HARQ feedback, the transmitting UE may transmit information indicating the relationship between a data link ID and an HARQ feedback to the receiving UE.

Figure 18:
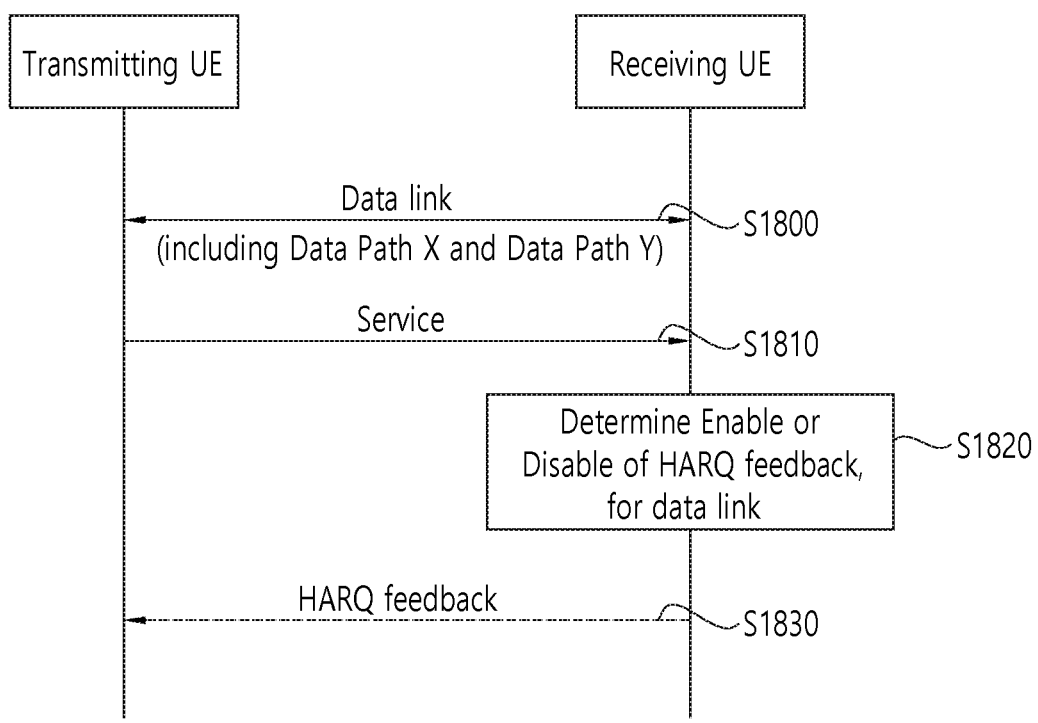
FIG. 18 shows a procedure of determining whether or not to perform, by a receiving UE, HARQ feedback for a data link including multiple data paths, in accordance with an embodiment of the present disclosure.

FIG. 18 shows a procedure of determining whether or not to perform, by a receiving UE, HARQ feedback for a data link including multiple data paths, in accordance with an embodiment of the present disclosure. The embodiment of FIG. 18 may be combined with other various embodiments of the present disclosure.

Referring to FIG. 18, in step S1800, a data link including Data Link X and Data Link Y may be configured between the transmitting UE and the receiving UE. Data Path X may be related to Destination ID X, and Data Path Y may be related to Destination ID Y.

In step S1810, the transmitting UE may transmit a service to the receiving UE on the data link. For example, the service may be a MAC PDU. For example, the service may include multiple data or packets having different QoS requirements.

In step S1820, the receiving UE may determine whether or not to enable HARQ feedback for the data link. Whether or not to enable HARQ feedback may be determined in data or packet units. For example, in case the service includes both data having high QoS requirements and data having low QoS requirements, the receiving UE may enable HARQ feedback for the service. For example, in case the service includes only data having low QoS requirements, the receiving UE may not enable HARQ feedback for the service.

In case the receiving UE enables HARQ feedback for the service, in step S1830, the receiving UE may enable HARQ feedback for the service to the transmitting UE. In order to allow the receiving UE to enable the HARQ feedback, the transmitting UE may include information enabling HARQ feedback on the SCI.

Figure 19:
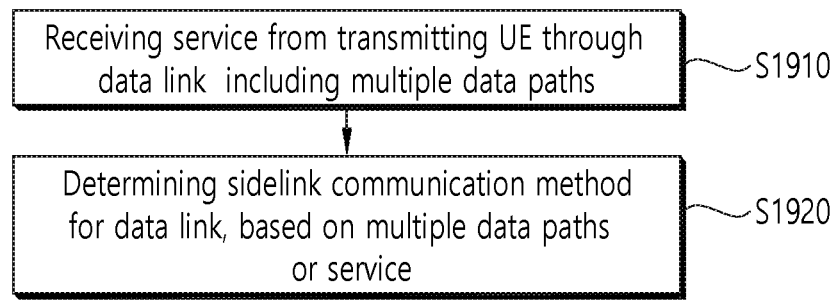
FIG. 19 shows a method for determining, by a UE, a communication method for a data link including multiple data paths, in accordance with an embodiment of the present disclosure.

FIG. 19 shows a method for determining, by a UE, a communication method for a data link including multiple data paths, in accordance with an embodiment of the present disclosure. The embodiment of FIG. 19 may be combined with other various embodiments of the present disclosure.

Referring to FIG. 19, in step S1910, the receiving UE may receive a service from the transmitting UE through a data link including multiple data paths. In step S1920, based on the multiple data paths or the service, the receiving UE may determine a sidelink communication method for the data link. The sidelink communication method may include whether or not HARQ feedback is to be enabled, a type of the transmission profile, a transmission parameter value (or transmission scheme type), and/or resource reservation cycle.

The proposed method may be applied to apparatuses that will hereinafter be described. Firstly, a processor (102) of a receiving UE (100) may control a transceiver (106) of the receiving UE (100) so as to enable a service to be received from a transmitting UE (200) through a data link including multiple data paths. And, based on the multiple data paths or the service, the processor (102) of the receiving UE (100) may determine a sidelink communication method for the data link. The sidelink communication method may include whether or not HARQ feedback is to be enabled, a type of the transmission profile, a transmission parameter value (or transmission scheme type), and/or resource reservation cycle.

Figure 20:
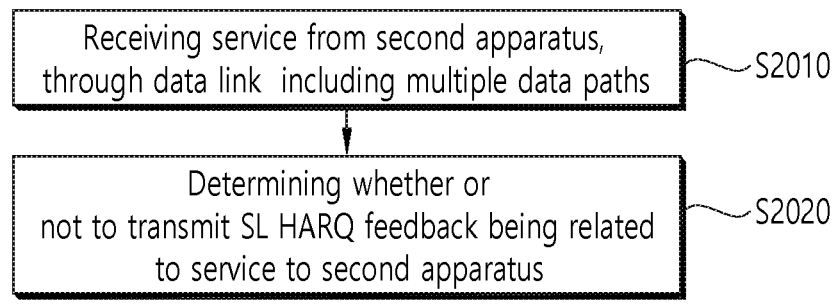
FIG. 20 shows a method for performing wireless communication, by a first apparatus, in accordance with an embodiment of the present disclosure.

FIG. 20 shows a method for performing wireless communication, by a first apparatus, in accordance with an embodiment of the present disclosure. The embodiment of FIG. 20 may be combined with other various embodiments of the present disclosure.

Referring to FIG. 20, in step S2010, a first apparatus may receive a service from a second apparatus, through a data link including multiple data paths. For example, based on the Quality of Service (QoS) of a service being transmitted through the multiple data paths, the data link may include the multiple data paths.

In step S2020, the first apparatus may determine whether or not to transmit a sidelink hybrid automatic repeat request (SL HARQ) feedback related to the service to the second apparatus.

For example, each of the multiple data paths may be related to a different destination identifier (ID), and the data link may be related to one data link ID.

For example, the QoS requirements may be related to the Enable of the SL HARQ feedback or the Disable of the SL HARQ feedback.

For example, the data link may include multiple data paths being related to the transmission of services having the same QoS requirements. For example, the data link may include multiple data paths being related to the transmission of services having a pre-configured QoS requirement range.

For example, the data link may include multiple data paths being related to the same transmission profile, the transmission profile may be a long term evolution (LTE)-based SL transmission or an NR-based SL transmission.

Additionally, the first apparatus may receive sidelink control information (SCI) being related to the service from the second apparatus, through the data link including the multiple data paths. Herein, based on whether or not the SL HARQ feedback is requested for a data path being related to the highest QoS requirements, among the QoS requirements related to the multiple data paths, the SCI may include information related to the Enable of the SL HARQ feedback or information related to the Disable of the SL HARQ feedback.

For example, based on an ID of the data link, the first apparatus may determine whether or not to transmit the SL HARQ feedback related to the service to the second apparatus. Additionally, for example, the first apparatus may transmit the SL HARQ feedback related to the service to the second apparatus, based on an ID of the data link being related to the Enable of the SL HARQ feedback. For example, based on the SL HARQ feedback being requested for a data path being related to the highest QoS requirements, among the QoS requirements related to the multiple data paths, the ID of the data link may be determined as an ID being related to the Enable of the SL HARQ feedback. For example, based on an ID of the data link being related to the Disable of the SL HARQ feedback, the first apparatus may determine not to transmit the SL HARQ feedback being related to the service to the second apparatus. For example, whether or not the ID of the data link is related to the Enable of the SL HARQ feedback may be determined for the first apparatus and the second apparatus. For example, based on the data link including multiple data paths being related to the transmission of a service having the highest QoS requirement, an ID of the data link may be determined as an ID being related to the Enable of the SL HARQ feedback.

The above-described embodiment may be applied to various apparatuses. For example, the processor (102) of the first apparatus (100) may control the transceiver (106) so that a service can be received from the second apparatus (200), through a data link including multiple data paths. For example, based on Quality of Service (QoS) requirements of a service being transmitted through the multiple data paths, the data link may include the multiple data paths. And, the processor (102) of the first apparatus (100) may determine whether or not to transmit a sidelink hybrid automatic repeat request (SL HARQ) feedback related to the service to the second apparatus (200).

According to the embodiment of the present disclosure, a first apparatus performing wireless communication may be provided. For example, the first apparatus may include one or more memories storing instructions, one or more transceivers, and one or more processors connected to the one or more memories and the one or more transceivers. The one or more processors may execute the instructions to receive a service from a second apparatus, through a data link including multiple data paths, and to determine whether or not to transmit a sidelink hybrid automatic repeat request (SL HARQ) feedback being related to the service to the second apparatus. Herein, based on Quality of Service (QoS) requirements of a service being transmitted through the multiple data paths, the multiple data paths may be included in the data link.

According to an embodiment of the present disclosure, an apparatus configured to control a first user equipment (UE) may be provided. For example, the apparatus may include one or more processors, and one or more memories being operably connectable to the one or more processors and storing instructions. For example, the one or more processors may execute the instructions to receive a service from a second apparatus, through a data link including multiple data paths, and to determine whether or not to transmit a sidelink hybrid automatic repeat request (SL HARQ) feedback being related to the service to the second apparatus. Herein, based on Quality of Service (QoS) requirements of a service being transmitted through the multiple data paths, the multiple data paths may be included in the data link.

According to an embodiment of the present disclosure, a non-transitory computer-readable medium having instructions recorded thereon may be provided. For example, when enacted by one or more processors, the instructions may cause the one or more processors to receive, by a first apparatus, a service from a second apparatus, through a data link including multiple data paths, and to determine, by the first apparatus, whether or not to transmit a sidelink hybrid automatic repeat request (SL HARQ) feedback being related to the service to the second apparatus. Herein, based on Quality of Service (QoS) requirements of a service being transmitted through the multiple data paths, the multiple data paths may be included in the data link.

FIG. 21 shows a method for performing wireless communication, by a second apparatus, in accordance with an embodiment of the present disclosure. The embodiment of FIG. 21 may be combined with other various embodiments of the present disclosure.

Referring to FIG. 21, in step S2110, a second apparatus may transmit a service to a first apparatus, through a data link including multiple data paths. Herein, based on Quality of Service (QoS) requirements of a service being transmitted through the multiple data paths, the data link may include the multiple data paths.

Additionally, based on the QoS requirements of the service, the second apparatus may determine an ID of the data link. For example, based on the service having high QoS requirements, the ID of the data link may be determined as an ID being related to an Enable of a sidelink hybrid automatic repeat request (SL HARQ) feedback.

The above-described embodiment may be applied to various apparatuses. For example, a processor (202) of a second apparatus (200) may control a transceiver (206) so that a service can be transmitted to a first apparatus (100), through a data link including multiple data paths. For example, based on Quality of Service (QoS) requirements of a service being transmitted through the multiple data paths, the data link may include the multiple data paths.

According to an embodiment of the present disclosure, a second apparatus for performing wireless communication may be provided. For example, the second apparatus may include one or more memories storing instructions, one or more transceivers, and one or more processors connected to the one or more memories and the one or more transceivers. For example, the one or more processors may execute the instructions to transmit a service to a first apparatus, through a data link including multiple data paths. Herein, based on Quality of Service (QoS) requirements of a service being transmitted through the multiple data paths, the data link may include the multiple data paths.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
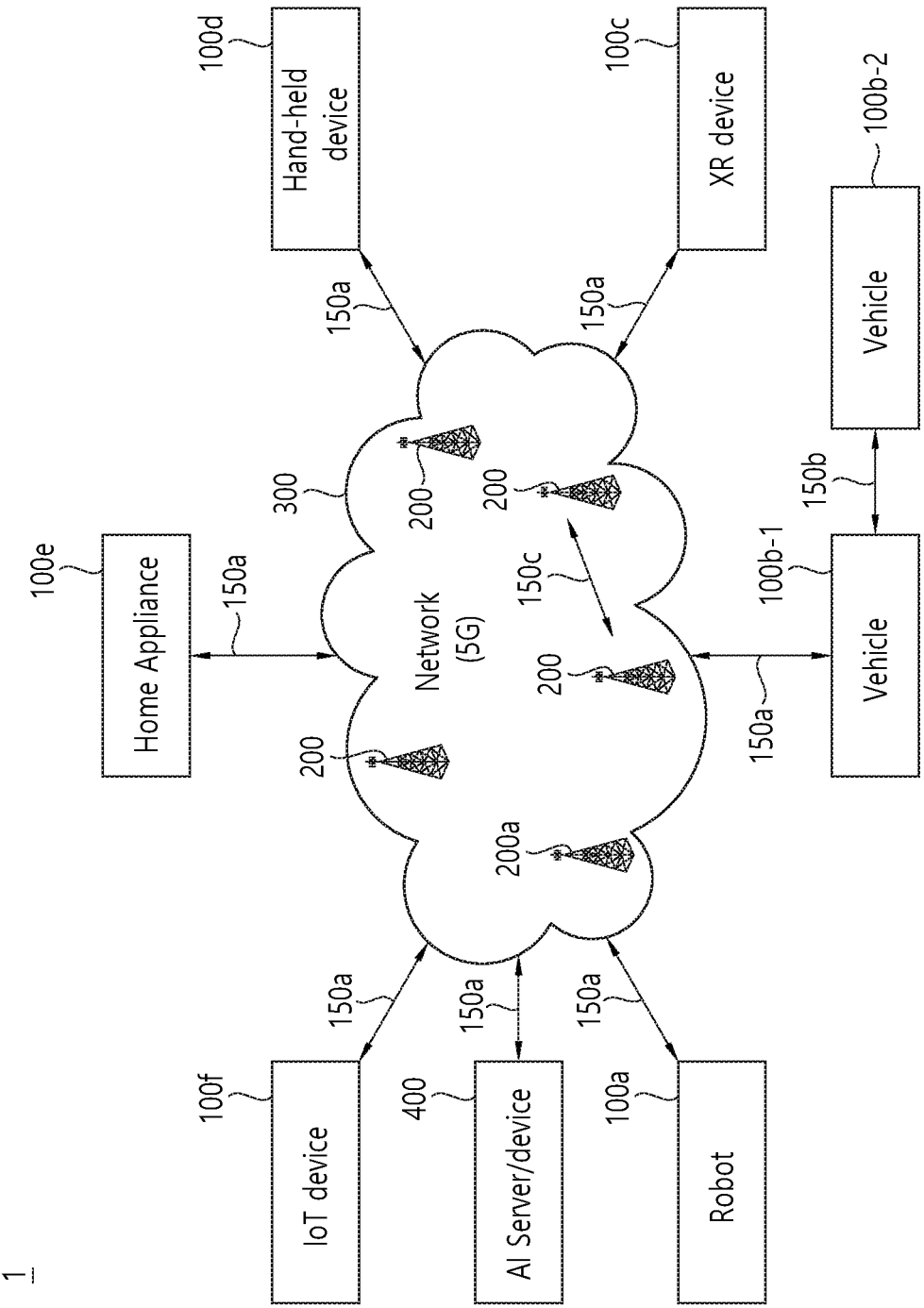
FIG. 22 shows a communication system 1, in accordance with an embodiment of the present disclosure.

FIG. 22 shows a communication system (1), in accordance with an embodiment of the present disclosure.

Referring to FIG. 22, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
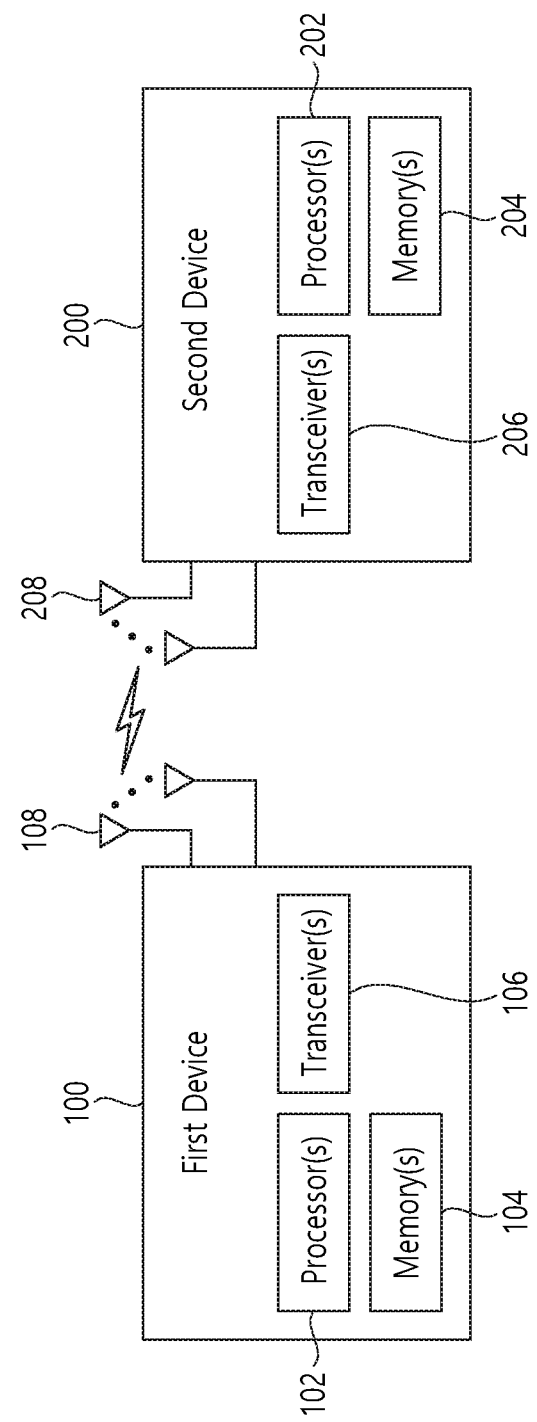
FIG. 23 shows wireless devices, in accordance with an embodiment of the present disclosure.

FIG. 23 shows wireless devices, in accordance with an embodiment of the present disclosure.

Referring to FIG. 23, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 24:
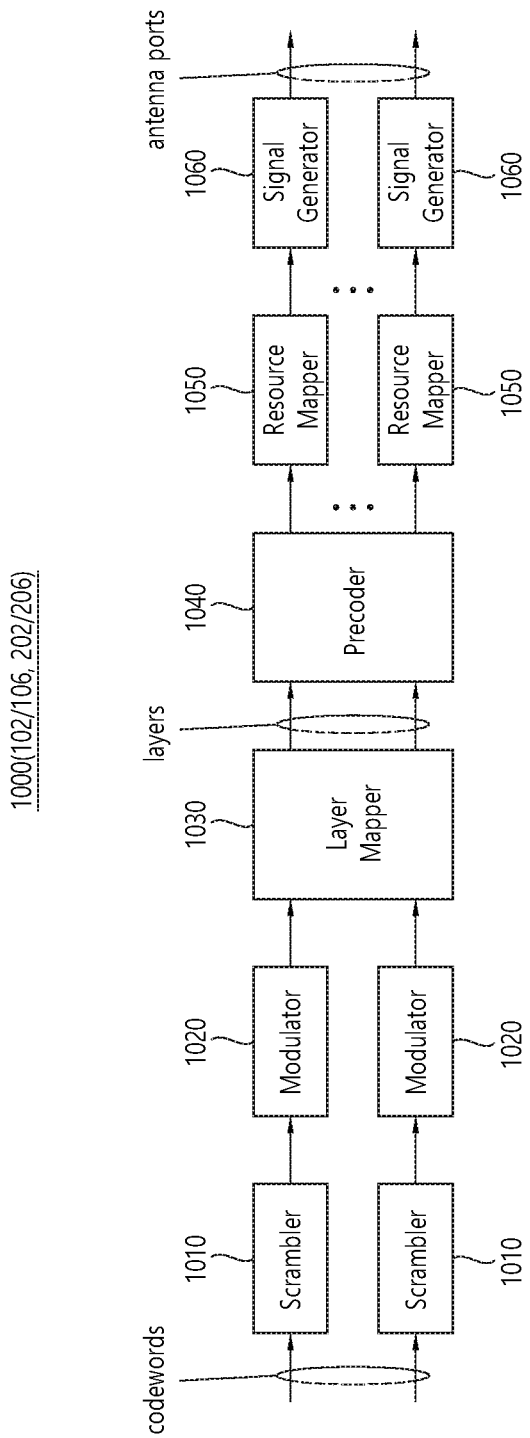
FIG. 24 shows a signal process circuit for a transmission signal, in accordance with an embodiment of the present disclosure.

FIG. 24 shows a signal process circuit for a transmission signal, in accordance with an embodiment of the present disclosure.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 23. Hardware elements of FIG. 24 may be implemented by the processors (102, 202) and/or the transceivers (106, 206) of FIG. 23. For example, blocks 1010~1060 may be implemented by the processors (102, 202) of FIG. 23. Alternatively, the blocks 1010~1050 may be implemented by the processors (102, 202) of FIG. 23 and the block 1060 may be implemented by the transceivers (106, 206) of FIG. 23.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 24. For example, the wireless devices (e.g., 100, 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
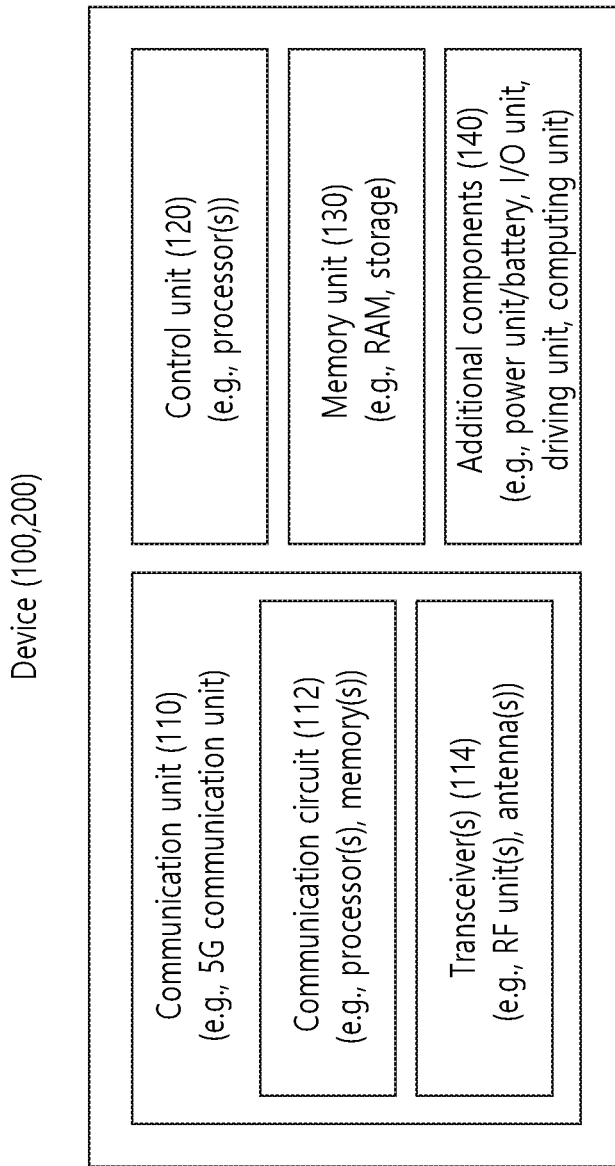
FIG. 25 shows a wireless device, in accordance with an embodiment of the present disclosure.

FIG. 25 shows another example of a wireless device, in accordance with an embodiment of the present disclosure. The wireless device may be implemented in various forms according to a use-case/service (refer to FIG. 22).

Referring to FIG. 25, wireless devices (100, 200) may correspond to the wireless devices (100, 200) of FIG. 23 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 23. For example, the transceiver(s) (114) may include the one or more transceivers (106, 206) and/or the one or more antennas (108, 208) of FIG. 23. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 22), the vehicles (100b-1, 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, and so on. The wireless device may be used in a mobile or fixed place according to a use-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
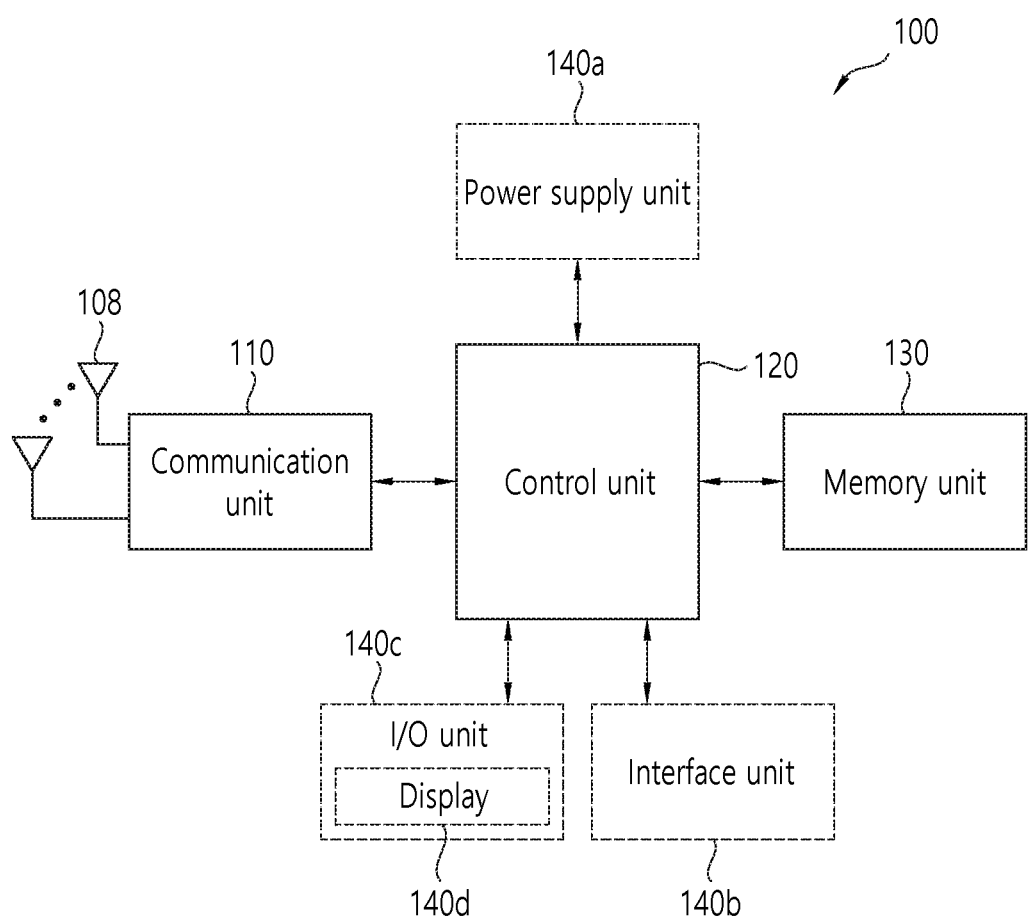
FIG. 26 shows a hand-held device, in accordance with an embodiment of the present disclosure.

FIG. 26 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit 108, a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 27:
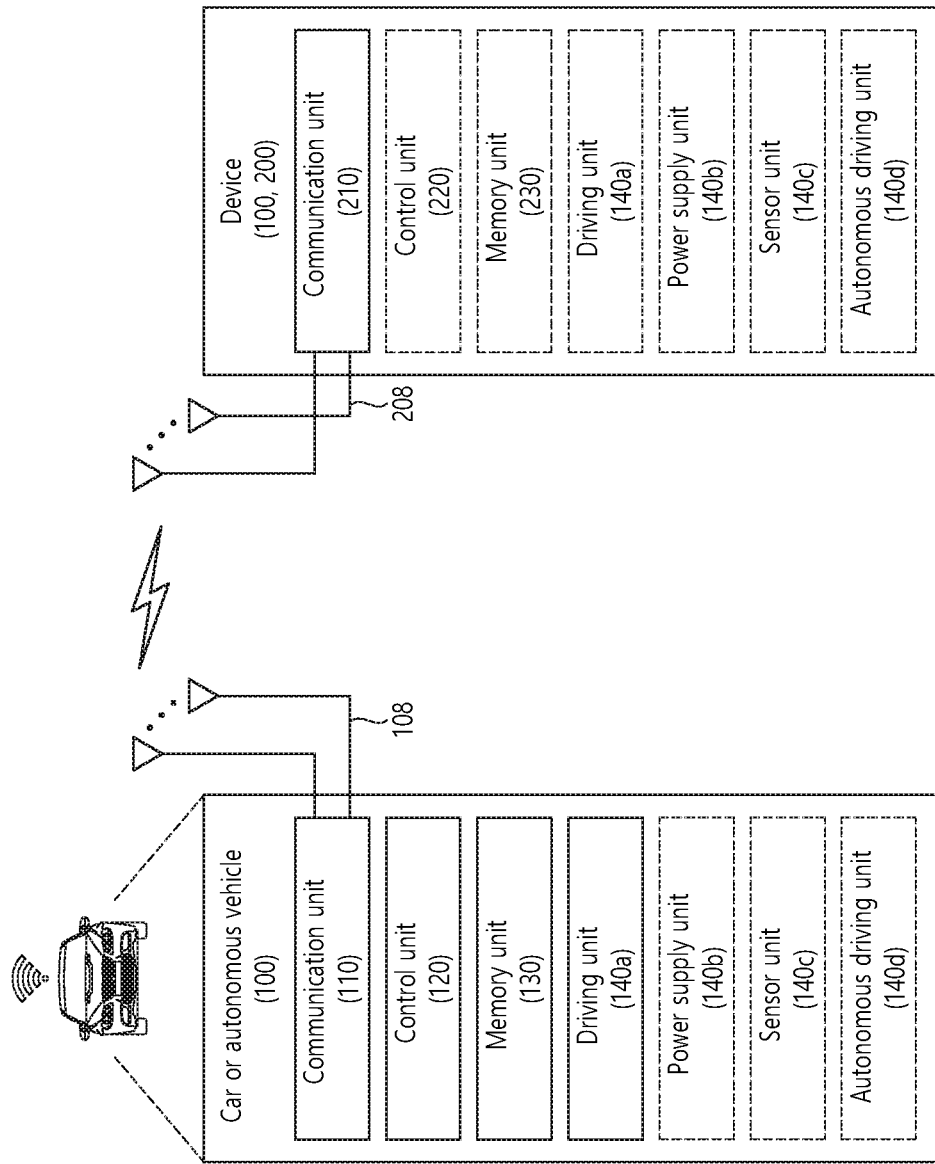
FIG. 27 shows a car or an autonomous vehicle, in accordance with an embodiment of the present disclosure.

FIG. 27 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 27, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information about a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for transmitting, by a first apparatus, hybrid automatic repeat request (HARQ) feedback, the method comprising:
   receiving, from a second apparatus, sidelink control information (SCI) including information that enables the HARQ feedback related to a first Medium Access Control Protocol Data Unit (MAC PDU);
   receiving, from the second apparatus, the first MAC PDU including data related to enabling of the HARQ feedback; and
   transmitting, to the second apparatus, the HARQ feedback in response to the first MAC PDU,
   wherein the first MAC PDU includes no data related to disabling of the HARQ feedback.

2. The method of claim 1, wherein the data related to enabling of the HARQ feedback and the data related to disabling of the HARQ feedback is not multiplexed into the first MAC PDU.

3. The method of claim 1, wherein the data related to enabling of the HARQ feedback is data related to high Quality of Service (QoS) requirement.

4. The method of claim 1, wherein the data related to enabling of the HARQ feedback is data within predetermined Quality of Service (QoS) requirement range.

5. The method of claim 1, further comprising:
   receiving, from the second apparatus, a second MAC PDU including data related to disabling of the HARQ feedback,
   wherein the second MAC PDU includes no data related to enabling of the HARQ feedback.

6. The method of claim 5, wherein the HARQ feedback in response to the second MAC PDU is not transmitted to the second apparatus.

7. The method of claim 5, further comprising:
   receiving, from the second apparatus, sidelink control information (SCI) including information that disables the HARQ feedback related to the second MAC PDU.

8. The method of claim 5, wherein the data related to disabling of the HARQ feedback is data related to low Quality of Service (QoS) requirements.

9. A first apparatus for transmitting hybrid automatic repeat request (HARQ) feedback, the first apparatus comprising:
   one or more memories storing instructions;
   one or more transceivers; and
   one or more processors connected to the one or more memories and the one or more transceivers, wherein the one or more processors execute the instructions to:
   receive, from a second apparatus, sidelink control information (SCI) including information that enables the HARQ feedback related to a first Medium Access Control Protocol Data Unit (MAC PDU);
   receive, from the second apparatus, the first MAC PDU including data related to enabling of the HARQ feedback; and
   transmit, to the second apparatus, the HARQ feedback in response to the first MAC PDU,
   wherein the first MAC PDU includes no data related to disabling of the HARQ feedback.

10. The first apparatus of claim 9, wherein the data related to enabling of the HARQ feedback and the data related to disabling of the HARQ feedback is not multiplexed into the first MAC PDU.

11. The first apparatus of claim 9, wherein the data related to enabling of the HARQ feedback is data related to high Quality of Service (QoS) requirement.

12. The first apparatus of claim 9, wherein the data related to enabling of the HARQ feedback is data within predetermined Quality of Service (QoS) requirement range.

13. The first apparatus of claim 9, wherein the one or more processors execute the instructions to:
   receive, from the second apparatus, a second MAC PDU including data related to disabling of the HARQ feedback,
   wherein the second MAC PDU includes no data related to enabling of the HARQ feedback.

14. The first apparatus of claim 13, wherein the HARQ feedback in response to the second MAC PDU is not transmitted to the second apparatus.

15. The first apparatus of claim 13, wherein the one or more processors execute the instructions to:
   receive, from the second apparatus, sidelink control information (SCI) including information that disables the HARQ feedback related to the second MAC PDU.

16. The first apparatus of claim 13, wherein the data related to disabling of the HARQ feedback is data related to low Quality of Service (QoS) requirements.

17. An apparatus configured to control a first user equipment (UE), the apparatus comprising:
   one or more processors; and
   one or more memories being operably connectable to the one or more processors and storing instructions, wherein the one or more processors execute the instructions to:
   receive, from a second UE, sidelink control information (SCI) including information that enables the HARQ feedback related to a first Medium Access Control Protocol Data Unit (MAC PDU);
   receive, from the second UE, the first MAC PDU including data related to enabling of the HARQ feedback; and
   transmit, to the second UE, the HARQ feedback in response to the first MAC PDU,
   wherein the first MAC PDU includes no data related to disabling of the HARQ feedback.

18. The apparatus of claim 17, wherein the data related to enabling of the HARQ feedback and the data related to disabling of the HARQ feedback is not multiplexed into the first MAC PDU.

* * * * *